E. P. FOLGER.
APPARATUS FOR COOLING WAX BEARING OIL FOR PRESSING.
APPLICATION FILED JAN. 13, 1914.
1,256,460.
Patented Feb. 12, 1918.
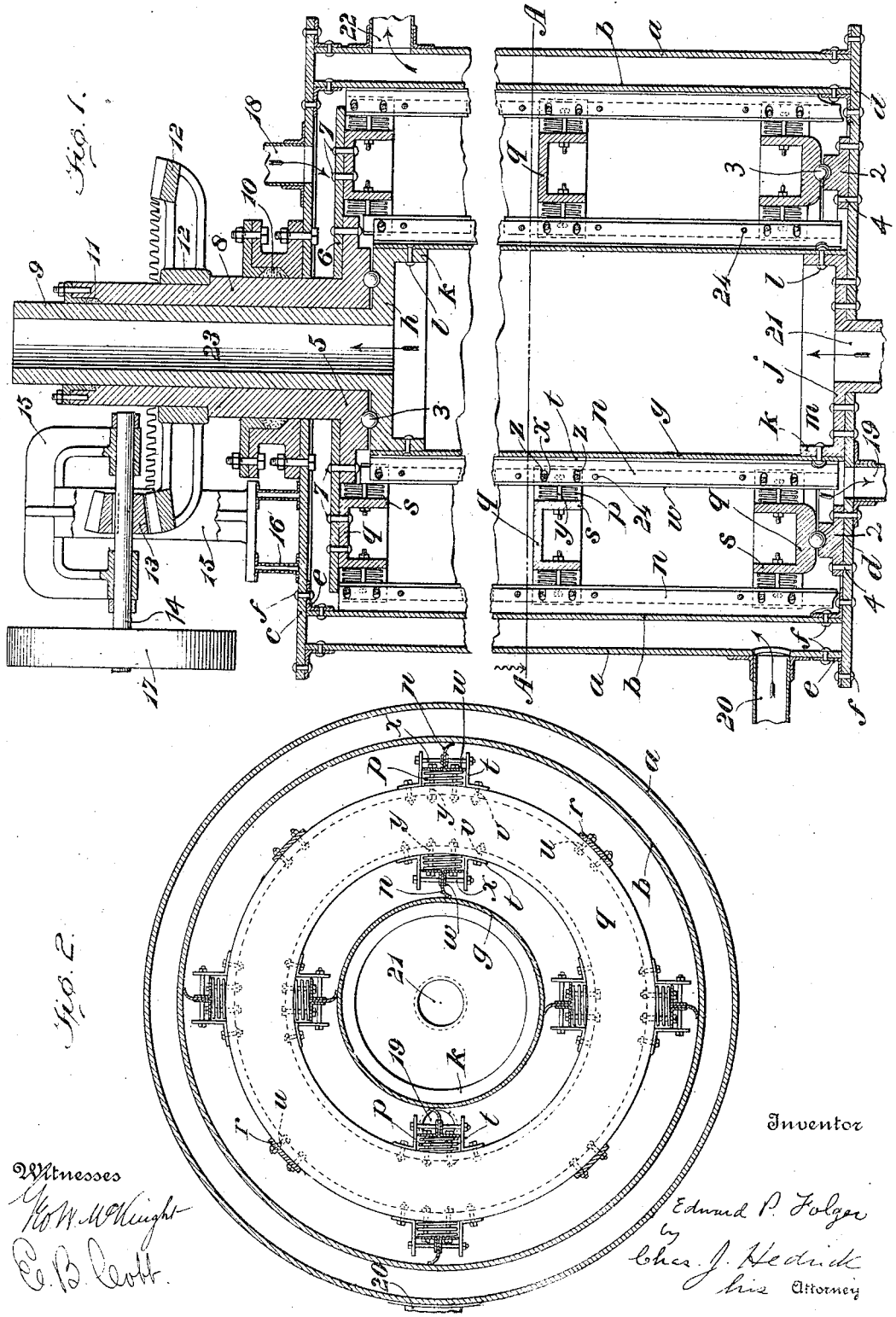

UNITED STATES PATENT OFFICE.

EDWARD P. FOLGER, OF BROOKLYN, NEW YORK, ASSIGNOR TO STANDARD OIL COMPANY, OF BAYONNE, NEW JERSEY, A CORPORATION OF NEW JERSEY.

APPARATUS FOR COOLING WAX-BEARING OIL FOR PRESSING.

1,256,460.  Specification of Letters Patent.  Patented Feb. 12, 1918.

Application filed January 13, 1914. Serial No. 811,823.

*To all whom it may concern:*

Be it known that I, EDWARD P. FOLGER, a citizen of the United States, residing at New York city, borough of Brooklyn, in the county of Kings and State of New York, have invented certain new and useful Improvements in Apparatus for Cooling Wax-Bearing Oil for Pressing, of which the following is a specification.

This invention relates to apparatus for cooling (chilling) heavy paraffin distillate, holding paraffin wax in solution and obtained by distilling petroleum in known manner, in order to precipitate paraffin wax therefrom preparatory to pressing the resulting magma for separation of the precipitated (congealed) paraffin wax, as customary; but each of the improvements is intended to be secured as well for all other uses to which the same can be applied; and modification is permissible indefinitely within the scope of the invention so long as the substance of any one or more of the hereinafter written claims is taken.

In the accompanying drawings, which represent what is considered the best form of the new or improved apparatus:

Figure 1 is a central vertical section of such apparatus with middle portion thereof removed, and Fig. 2 is a cross section on line A—A of Fig. 1.

The concentric cylinders $a$ $b$ of different diameters are provided top and bottom with heads $c$ $d;$ which (as shown) are secured to the cylinders by rings $e$ of angle iron and rivets $f$. A cylinder $g$ of smaller diameter than cylinder $b$ is placed concentrically within the latter and is provided top and bottom with heads $h$ $j;$ which are best made separate from the heads $c$ $d$. They have (as shown) peripheral flanges $k$ by which they are secured to the cylinder $g$ by means of rivets $l$. The head $j$ is shown as secured to the head $d$ of cylinders $a$ $b$ by rivets $m$.

Thus there is left between the cylinders $b$ $g$ a chamber elongated in the direction of the axis of the apparatus and annular in cross section; and this chamber is interposed between other chambers; which are formed respectively by the interior of cylinder $g$ and the space between the cylinders $a$ $b;$ and from which it is separated by heat conducting walls. The first mentioned chamber (hereinafter termed the chilling chamber) receives the heavy paraffin distillate to be chilled; and the inclosing chambers receive the cooling (or chilling) medium (water, brine, air or other fluid of appropriate temperature). The paraffin wax precipitated out of solution by the low temperature naturally attaches itself to the walls of the chilling chamber and has to be removed mechanically. Traveling scrapers $n$ are, therefore, provided; which bear in opposite directions on the opposing walls of the chamber. They travel around in the chilling chamber, and are best held against their corresponding walls by the pressure of springs $p$. They are also best formed of bars or plates; whose length is transverse to the direction of rotation; and they are best mounted on a scraper frame composed of rings $q$ and interconnecting strips $r$ rigidly fastened together. As shown the rings $q$ have peripheral flanges $s;$ to which the strips $r$ and also brackets $t$ of the scraper holders are secured by bolts $u$ and $v$, respectively. The scraper bars $n$ as shown are provided each of them with two angle strips $w;$ between which the scraper bar is secured (by bolts 24, as shown). The scraper bars and angle strips are supported and guided in part by bolts $x$ and in part by bolts $y$, bolts $x$ extending between brackets $t$ of the corresponding pair and passing through the scraper bar and parallel webs of the angle strips $w$, and the bolts $y$ passing through the transverse webs of said angle strips and the peripheral flanges of one of the rings $q$.

The holes $z$ in the scraper bars and angle pieces, through which the bolts $x$ pass, are sufficiently elongated to allow a small play in and out to the scraper bars. The bolts $y$ can be tightened, if desired (by means of their nuts), sufficiently to limit the outward motion, but should not be so tight as to hold the scrapers clear of the chamber walls.

The scrapers and their supporting frame are mounted in bearings, which are best constituted by the ring 2 and the head $h;$ and which best have anti-friction rollers 3 interposed between said bearings and opposing portions of the scraper frame. The ring 2 as shown rests upon the head $d$ and is fastened thereto by rivets 4; and rollers 3 (shown in the form of balls) are interposed between said ring 2 and the bottom ring $q$ of the scraper frame, the opposing faces of said rings being appropriately grooved to form ways for said rollers. The head *h* is fastened to the cylinder *g*, as already mentioned; and rollers 3 (in the form of balls) are interposed between said head *h* and a carrier 5; to which the top ring *q* of the scraper frame is secured by the intermediary (as shown) of a disk 6 and rivets 7. The opposing faces of said head *h* and carrier 5 are appropriately grooved to form ways for the rollers 3.

In order to give greater steadiness to the scraper frame, the carrier 5 is provided with a journal bearing of sufficient length to afford a substantial resistance against lateral motion of the scraper frame at the bottom thereof. This journal bearing is best formed by a suitably elongated sleeve 8 on the carrier 5 rotating upon a projection 9 on the head *h*, both sleeve and projection passing through a hole in the head *c*; the joint being protected against leakage by a stuffing box 10. It is best also to provide a stuffing box 11 between said sleeve 8 and projection 9.

The scraper frame can be rotated by any appropriate gearing. As shown a bevel gear 12, fast on sleeve 8, intermeshes with a bevel pinion 13 fast on the cross shaft 14. This last is journaled in bearings on the bracket 15; which is upheld by beams 16 that rest upon and are appropriately fastened to the head *c*. At 17 is a driving pulley fast on shaft 14.

The inlets and outlets of the three chambers can be located and arranged as may be desired; but it is considered best to let the distillate to be chilled in at the top of the chilling chamber and to discharge the resulting magma (composed of the chilled liquid and paraffin scales in suspension therein) at the bottom of said chamber (inlet 18 and outlet 19 being shown for the purpose) and to let the cooling fluid in at the bottom of each of the inclosing chambers (by inlets 20 and 21 respectively) and to discharge the warmed fluid at the top of said chambers (by outlets 22 and 23 respectively, outlet 23 being formed by making the projection 9 tubular).

The apparatus can be used singly, or a number of them can be used together in a system. Two or more of them can, for example, be connected in series in such manner that the cooling fluid and the liquid to be chilled travel in opposite directions through the series as a whole as well as through each apparatus.

I claim as my invention or discovery:

1. Apparatus of the character set forth, having an elongated chilling chamber annular in cross section, a parallel chamber located inside said chilling chamber and separated by a heat conducting wall therefrom, a parallel chamber located outside of said chilling chamber and separated therefrom by a heat conducting wall, scrapers located within said chilling chamber and arranged to bear simultaneously on opposite sides of said chilling chamber, means whereby said scrapers are yieldingly supported and moved in said chilling chamber, and springs for forcing them respectively against the corresponding walls of said chilling chamber, said chilling chamber being provided with an inlet for the liquid to be chilled and an outlet for the resulting magma, and the inclosing chambers being provided with inlets for the cooling fluid and outlets for the warmed fluid, substantially as described.

2. The combination with an elongated chamber annular in cross section, of a head, illustrated by head *h* of cylinder *g*, which is located inside the inner wall of the said chamber at one end thereof, a scraper frame located within the said chamber and composed in part of a carrier bearing on said head, in part of rings which include one that has a bearing at the end of said chamber opposite to said head and one that is fastened to said carrier, and in part of connecting strips that are fastened to said rings and scrapers mounted on said frame and arranged to bear against opposite sides of said chamber, substantially as described.

3. The combination with an elongated chamber annular in cross section, of a head, illustrated by head *h* of cylinder *g*, which is located inside the inner wall of the said chamber at one end thereof, a scraper frame located within the said chamber and composed in part of a carrier bearing on said head and provided with a journal bearing of sufficient length to oppose substantial resistance to lateral movement of the scraper frame at its far end, in part of rings which include one that has a bearing at the end of said chamber opposite to said head and one that is fastened to said carrier, and in part of connecting strips that are fastened to said rings, and scrapers mounted on said frame and arranged to bear against opposite sides of said chamber, substantially as described.

4. The combination with an elongated chamber annular in cross section, of a head, illustrated by head *h* of cylinder *g*, which is located inside the inner wall of the said chamber at one end thereof and is provided with a projection on the side away from the center of said chamber, a scraper frame located within the said chamber and composed in part of a carrier bearing on said head and provided with a sleeve which is journaled on the projection belonging to said head, in part of rings which include one that has a bearing at the end of said chamber opposite to said head and one that is fastened to said carrier, and in part of connecting strips that are fastened to said rings, and scrapers mounted on said frame and arranged to bear against opposite sides of said chamber, substantially as described.

5. In an apparatus wherein scraping devices are employed, the combination of a pair of angle strips having one web of each secured to one web of the other in such manner that the remaining webs project outwardly from the webs so secured together, a scraper bar interposed and confined between the webs so secured together, a scraper frame, brackets secured to said frame and located on opposite sides of said angle strips, springs interposed between said frame and the outwardly projecting webs of said angle strips, and bolts which limit the movement of said angle strips and scraper bar between said brackets, substantially as described.

In testimony whereof I have affixed my signature in presence of two witnesses.

EDWARD P. FOLGER.

Witnesses:
ROBERT R. KELLY,
L. A. REFFERT.

Copies of this patent may be obtained for five cents each, by addressing the "Commissioner of Patents, Washington, D. C."